United States Patent
Wind et al.

(10) Patent No.: US 12,245,690 B2
(45) Date of Patent: Mar. 11, 2025

(54) METHOD AND APPARATUS STREAMLINING WATER BOTTLE DELIVERY

(71) Applicant: ZEPHYR FLUID SOLUTIONS, LLC, Newtown, CT (US)

(72) Inventors: Patrick Wind, Darien, CT (US); Tim Marshall, Wolcott, CT (US)

(73) Assignee: ZEPHYR FLUID SOLUTIONS, LLC, Newtown, CT (US)

( * ) Notice: Subject to any disclaimer, the term of this patent is extended or adjusted under 35 U.S.C. 154(b) by 0 days.

(21) Appl. No.: 18/197,389

(22) Filed: May 15, 2023

(65) Prior Publication Data
US 2023/0363531 A1 Nov. 16, 2023

Related U.S. Application Data

(60) Provisional application No. 63/341,721, filed on May 13, 2022.

(51) Int. Cl.
*A47B 73/00* (2006.01)

(52) U.S. Cl.
CPC ...... *A47B 73/00* (2013.01); *A47B 2220/0027* (2013.01); *A47B 2220/0091* (2013.01)

(58) Field of Classification Search
CPC . G01F 19/4144; G06Q 10/087; A47B 81/007; A47B 73/00; A47B 2220/0027; A47B 2220/0091; A47F 2010/025
See application file for complete search history.

(56) References Cited

U.S. PATENT DOCUMENTS

| | | | | | |
|---|---|---|---|---|---|
| 3,329,282 | A | * | 7/1967 | Swan | A47F 5/14 211/190 |
| 3,948,581 | A | * | 4/1976 | Helman | A47B 47/05 312/238 |
| 5,372,262 | A | * | 12/1994 | Benson | A47B 47/02 312/265.4 |
| 5,405,017 | A | * | 4/1995 | Szabo, Sr. | A47F 7/30 211/175 |
| 5,671,362 | A | * | 9/1997 | Cowe | G07F 7/00 340/568.1 |
| 6,135,297 | A | * | 10/2000 | DeShazo | A47B 81/007 211/74 |

(Continued)

FOREIGN PATENT DOCUMENTS

| | | | | |
|---|---|---|---|---|
| EP | 3623775 A1 | * | 3/2020 | A47F 3/02 |
| JP | H0262244 U | * | 5/1990 | |
| WO | WO-2022246234 A1 | * | 11/2022 | |

*Primary Examiner* — Patrick D Hawn
(74) *Attorney, Agent, or Firm* — CANTOR COLBURN LLP

(57) ABSTRACT

A storage rack for a plurality of water bottles, including: a plurality of shelves; a plurality of levelers each being configured to support the storage rack, each leveler of the plurality of levelers is operably coupled to one of a plurality of potentiometers that is located between the each leveler of the plurality of levelers and a portion of the storage rack, the plurality of potentiometers are operably coupled to a analog to digital converter that sums signals of the plurality of potentiometers and provides an indication of an amount of weight being supported by the storage rack, the amount of weight being associated with an amount of water bottles being supported by the storage rack.

14 Claims, 4 Drawing Sheets

(56) References Cited

U.S. PATENT DOCUMENTS

| | | | | |
|---|---|---|---|---|
| 6,450,360 | B1* | 9/2002 | Hyde | B65G 1/07 |
| | | | | 211/59.3 |
| 7,180,015 | B2* | 2/2007 | Hudson | G01G 19/14 |
| | | | | 177/148 |
| 10,591,348 | B1* | 3/2020 | Shi | A47F 3/0408 |
| 10,809,122 | B1* | 10/2020 | Danenberg | A47F 5/103 |
| 11,116,332 | B2* | 9/2021 | Weiss | A47F 3/02 |
| 11,229,285 | B1* | 1/2022 | Spadavecchia | A47B 73/006 |
| 11,707,338 | B2* | 7/2023 | Grimsley | G01G 19/4144 |
| | | | | 177/144 |
| 11,877,658 | B2* | 1/2024 | Ratermann | A47F 10/00 |
| 2013/0284806 | A1* | 10/2013 | Margalit | G07G 1/0009 |
| | | | | 235/382 |
| 2018/0189722 | A1* | 7/2018 | Aepli | G01L 1/14 |
| 2019/0104864 | A1* | 4/2019 | Barnet | A47B 96/021 |

* cited by examiner

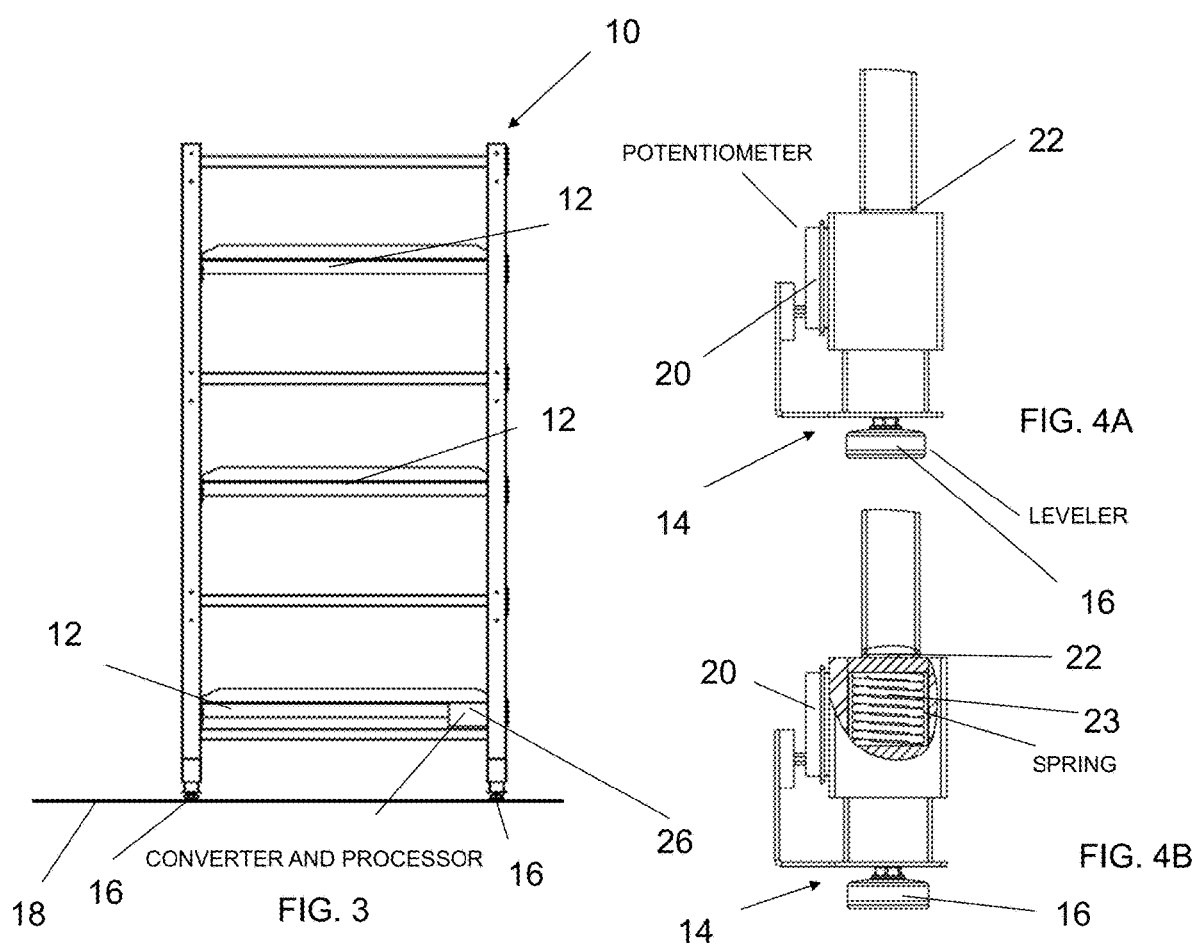

METHOD AND APPARATUS STREAMLINING WATER BOTTLE DELIVERY

CROSS REFERENCE TO RELATED APPLICATIONS

This application claims priority to U.S. Provisional Patent Application No. 63/341,721 filed on May 13, 2022, the entire contents of which are incorporated herein by reference thereto.

BACKGROUND

Exemplary embodiments of the present disclosure relate generally to an apparatus and method for streamlining the delivery of water bottles.

Consumers purchase large sized (e.g., 5 gallon, 3 gallon or equivalently sized) water bottles for use in home or other applications in addition to those traditionally used in commercial environments wherein a delivery truck arrives periodically to collect the empty bottles while supplying a fresh supply of filled water bottles. In these applications and since it is not economically feasible for scheduled deliveries from a delivery truck, the consumer is typically purchasing one or two bottles at a time from a store while at the same time returning their empty bottles.

The current methodology for ensuring an adequate amount of water bottles are at the store for purchase is for drivers of a delivery truck to make routine stops along a route to replenish a water bottle rack. The route is made up from historical data or convenience in an attempt to replenish the rack before it is empty but not before a significant number of bottles have been removed. Making a delivery after the rack is empty could result in loss of sales and replenishing it too quickly results in inefficient transportation costs.

Accordingly, it is desirable to provide a system and a method for ensuring an adequate amount of water bottles are available for purchase.

BRIEF DESCRIPTION

Disclosed is a storage rack for a plurality of water bottles, including: a plurality of shelves: a plurality of levelers each being configured to support the storage rack, each leveler of the plurality of levelers is operably coupled to one of a plurality of potentiometers that is located between the each leveler of the plurality of levelers and a portion of the storage rack, the plurality of potentiometers are operably coupled to a analog to digital converter that sums signals of the plurality of potentiometers and provides a numerical value that is an indication of an amount of weight being supported by the storage rack, the amount of weight being associated with an amount of water bottles being supported by the storage rack.

In addition to one or more of the features described above, or as an alternative to any of the foregoing embodiments, the analog to digital converter includes a signal conditioner that will take summed signals from the plurality of potentiometers and condition them for an output to a processor, the output corresponding to the amount of weight being supported by the storage rack.

In addition to one or more of the features described above, or as an alternative to any of the foregoing embodiments, the processor is configured to receive the output from the converter and provide the output via a communication protocol.

Also disclosed is a system for determining an amount of water bottles located a retail location, including: a storage rack, the storage rack including: a plurality of shelves: a plurality of levelers each being configured to support the storage rack, each leveler of the plurality of levelers is operably coupled to one of a plurality of potentiometer that is located between the each leveler of the plurality of levelers and a portion of the storage rack, the plurality of potentiometers are operably coupled to an analog to digital converter that sums signals of the plurality of potentiometers and provides an indication of an amount of weight being supported by the storage rack, the amount of weight being associated with an amount of water bottles being supported by the storage rack; and a device to communicate by but not limited to WiFi or cellular communication.

In addition to one or more of the features described above, or as an alternative to any of the foregoing embodiments, the analog to digital converter includes a signal conditioner that will take summed signals from the plurality of potentiometers and condition them for an output to a processor, the output corresponding to the amount of weight being supported by the storage rack.

In addition to one or more of the features described above, or as an alternative to any of the foregoing embodiments, the processor is configured to receive the output from the converter and provide the output via a communication protocol.

In addition to one or more of the features described above, or as an alternative to any of the foregoing embodiments, the communication protocol is selected from the group comprising: WiFi: Cellular; Gateway; and an access point.

In addition to one or more of the features described above, or as an alternative to any of the foregoing embodiments, the device is selected from the group comprising: a cell phone: a server; a laptop; and a tablet.

Also disclosed is a method for determining an amount of water bottles located a retail location, including: providing a storage rack, the storage rack including: a plurality of shelves: a plurality of levelers each being configured to support the storage rack, each leveler of the plurality of levelers is operably coupled to one of a plurality of potentiometer that is located between the each leveler of the plurality of levelers and a portion of the storage rack, the plurality of potentiometers are operably coupled to an analog to digital converter that sums signals of the plurality of potentiometers and provides an indication of an amount of weight being supported by the storage rack, the amount of weight being associated with an amount of water bottles being supported by the storage rack: receiving by a cloud platform operably coupled to the storage rack the indication of the amount of weight being supported by the storage rack; and providing a notification to a device operably coupled to the cloud platform, the notification indicating an approximate amount of water bottles located on the storage rack.

In addition to one or more of the features described above, or as an alternative to any of the foregoing embodiments, the analog to digital converter includes a signal conditioner that will take summed signals from the plurality of potentiometers and condition them for an output to a processor, the output corresponding to the amount of weight being supported by the storage rack.

In addition to one or more of the features described above, or as an alternative to any of the foregoing embodiments, the processor is configured to receive the output from the signal conditioner and provide the output via a communication protocol.

In addition to one or more of the features described above, or as an alternative to any of the foregoing embodiments, the communication protocol is selected from the group comprising: WiFi: Cellular: Gateway; and an access point.

In addition to one or more of the features described above, or as an alternative to any of the foregoing embodiments, the device is selected from the group comprising: a cell phone: a server: a laptop; and a tablet.

In addition to one or more of the features described above, or as an alternative to any of the foregoing embodiments, the device is selected from the group comprising: a cell phone: a server; a laptop; and a tablet.

BRIEF DESCRIPTION OF THE DRAWINGS

The following descriptions should not be considered limiting in any way. With reference to the accompanying drawings, like elements are numbered alike:

FIG. 3 is a side view of the water bottle rack of FIG. 1:

FIGS. 4A and 4B are enlarged views of a portion of the water bottle rack; and

DETAILED DESCRIPTION

Figure 1:
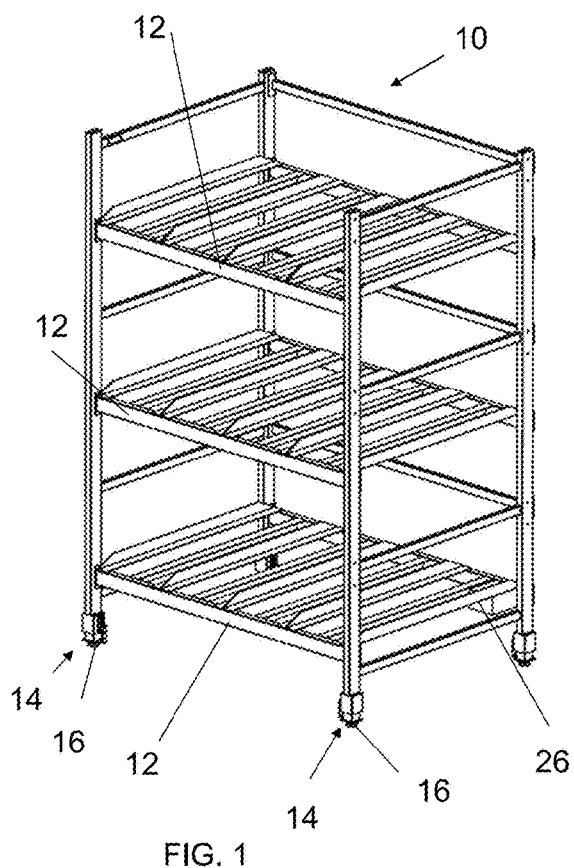
FIG. 1 is a perspective view of a water bottle rack in accordance with the present disclosure.
Figure 2:
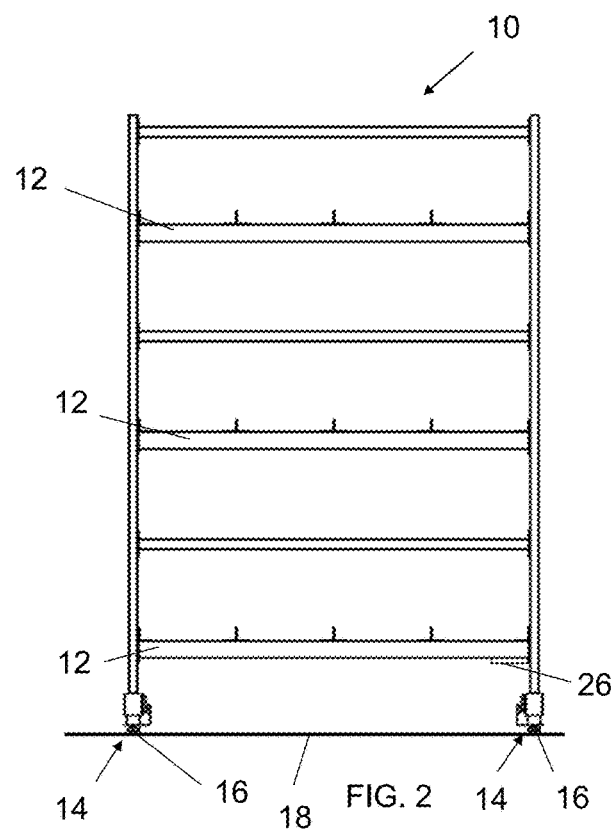
FIG. 2 is a front view of the water bottle rack of FIG. 1.
Figure 2A:
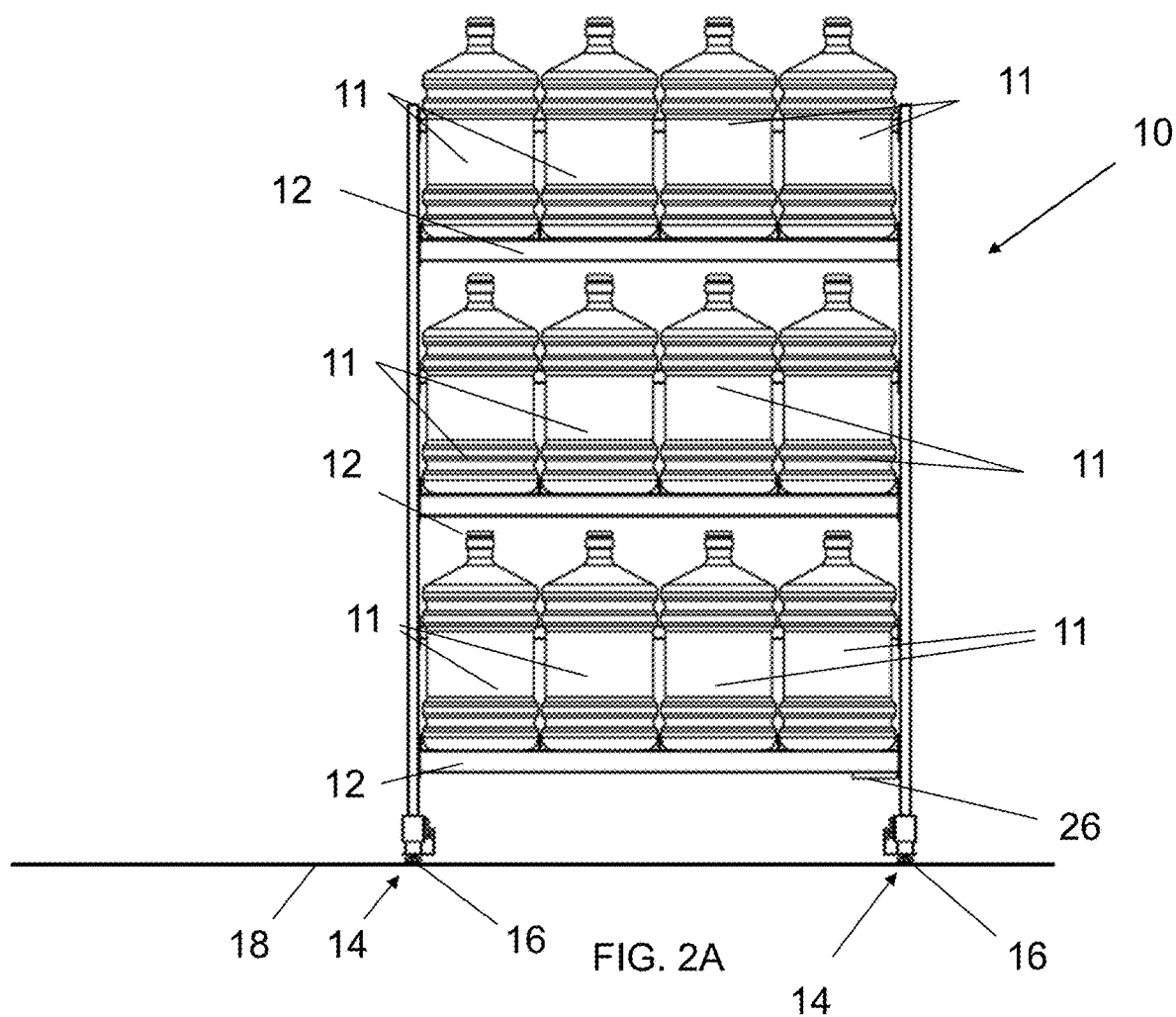
FIG. 2A is a front view of the water bottle rack of FIG. 1 filled with a plurality of water bottles.
Figure 5:
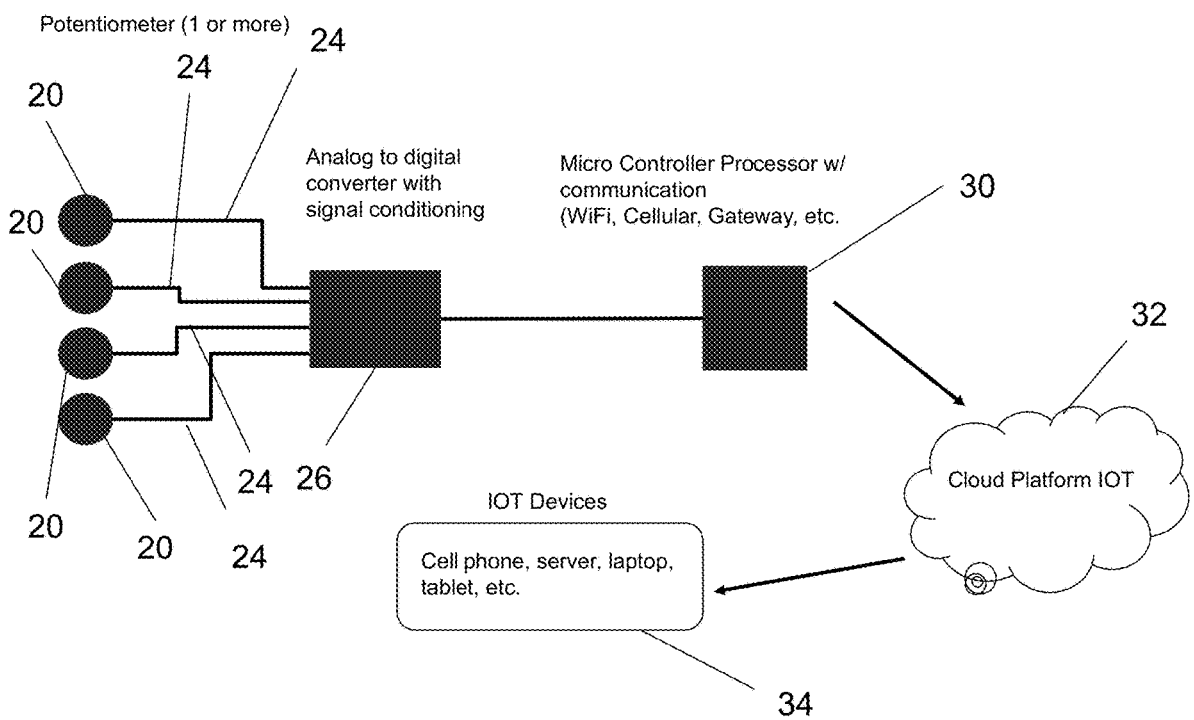
FIG. 5 is a schematic view an apparatus and system for measuring a load placed upon a water bottle rack in accordance with the present disclosure.

A detailed description of one or more embodiments of the disclosed apparatus and method are presented herein by way of exemplification and not limitation with reference to the Figures.

Referring now to FIGS. a storage rack 10 for a plurality of water bottles 11 is illustrated. The storage rack 10 includes a plurality of shelves 12 so that the plurality of water bottles can be stored therein. The storage rack 10 includes a plurality of feet 14 or a plurality of levelers 16 each being configured to support the storage rack 10 on a surface 18. Each leveler 16 is operably coupled to a potentiometer 20, which is located between the leveler 16 and a portion 22 of the storage rack 10. The potentiometer measures the linear displacement between portion 22 and leveler 16. This displacement is equal to the travel of a spring 23 which is a function of the spring rate. The spring rate is selected based upon the weight of the objects on the rack and the desired displacement or movement when objects are removed or added to the storage rack. The analog output of the potentiometer's 20 displacement is converted into a digital signal which is correlated to a change in weight. As used herein a potentiometer 20 refers to a device that measures a mechanical force (e.g., the weight applied to it by the storage rack 10). Thus, the potentiometers 20 are used to measure the weight of the storage rack 10 and the approximate amount of full water bottles 11 located on it. As used herein full water bottles refers to a water bottle filled with water. The size of the water bottle may be anyone of 5 gallon, 3 gallon or any equivalently size water bottle suitable for retail sale. While various embodiments of the present disclosure are directed to a storage rack for water bottles 11, it is also contemplated that is may be suitable to other type of liquids or consumer products that can be stored on the storage rack 10 and requires replenishment after a certain amount of the products have been sold and removed from the storage rack 10 thereby reducing the amount of weight being supported by the storage rack 10. In one non-limiting embodiment, the storage rack 10 includes four feet or four levelers 16 and thus four potentiometers 20. Of course, the number of potentiometers 20 may vary to be greater or less than four.

Each potentiometer 20 has potentiometer wires 24 that are operably coupled to an analog to digital converter 26 so that the signals of each potentiometer 20 are provided to the analog to digital converter 26. The analog to digital converter 26 sums all of the signals of the potentiometers 20 and provides an indication of the amount of weight being supported by the storage rack 10. The amount of weight being associated with the amount of full water bottles 11 being supported by the storage rack 10. Thus, the amount of weight being supported by the storage rack 10 corresponds to the amount of full water bottles 11 being supported by the storage rack 10.

The analog to digital converter 26 includes a signal conditioner 28 that will take the summed signals from the potentiometers 20 and condition them for an output to a processor 30. The output corresponding to the amount of weight being supported by the storage rack 10 which in turn corresponds to the amount of full water bottles 11 being supported by the storage rack 10.

The processor 30 is configured to receive the conditioned output from the signal conditioner 28 and provide the conditioned output via a communication protocol such as WiFi, Cellular, Gateway, access point etc. to a cloud platform 32, which is located on a server remote from the location of the storage rack 10. As mentioned above, the conditioned output will be the amount of weight being supported by the storage rack 10 which corresponds to the amount of full water bottles 11 being supported by the storage rack 10.

The cloud platform 32 will have code executed by a processor that can take appropriate actions based upon the weight of the storage rack 10. For example, if the weight of the storage rack is less than a predetermined amount this will indicate that the storage rack 10 has less than 50% of its storage value (e.g. 50% of the total amount of full water bottles 11 that can be stored on the storage rack 10). It is, of course, understood that the aforementioned values are merely provided as an example and other predetermined amounts and percentages are contemplated to be within the scope of the present disclosure. For example, another predetermined amount will indicate that the storage rack 10 has less than 75% of its storage value (e.g. 75% of the total amount of full water bottles 11 that can be stored on the storage rack 10) or another predetermined amount will indicate that the storage rack 10 has less than 25% of its storage value (e.g. 25% of the total amount of full water bottles 11 that can be stored on the storage rack 10). Of course, many other weights and percentages are contemplated to be within the scope of the present disclosure.

The cloud platform 32 once receiving the weight of the storage rack 10 will send a notification to a device 34 such as a cell phone, server, laptop, tablet, etc., indicating the approximate amount of full water bottles 11 on the storage rack 10. This information can be directly sent to a delivery truck so that they can determine whether the location where the storage rack 10 is located requires a delivery of full water bottles 11 to replace those that have been removed or sold.

The solution of the present disclosure will notify a central location or a driver that the storage rack 10 has only a certain number of full water bottles 11 remaining so a delivery can be made before running out of full water bottles 11 or develop an efficient delivery route.

As such and when the weight of the storage rack 10 reaches a preset value corresponding to the removal of a certain amount of full water bottles 11, the communication enabled processor 30 will send a notification to the device 34 indicating that the storage rack 10 needs to be replenished.

In one non-limiting exemplary embodiment, processor 30, cloud platform 32 and device 34 may include a microprocessor, microcontroller or other equivalent processing device capable of executing commands of computer readable data or program for executing a control algorithm in order to provide the weight of the storage rack 10. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces.

A computer readable storage medium (or media) having computer readable program instructions thereon may be used for causing a processor to carry out aspects of the present disclosure. The computer readable storage medium can be a tangible device that can retain and store instructions. The computer readable storage medium may be, for example, but is not limited to, an electronic storage device or any suitable equivalent.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A storage rack for a plurality of water bottles, comprising:
    a plurality of shelves;
    a plurality of levelers each being configured to support the storage rack, each leveler of the plurality of levelers is operably coupled to one of a plurality of potentiometers that is located between the each leveler of the plurality of levelers and a portion of the storage rack, the plurality of potentiometers are operably coupled to an analog to digital converter configured to provide an indication of an amount of weight being supported by the storage rack, the amount of weight being associated with an amount of water bottles being supported by the storage rack.

2. The storage rack as in claim 1, wherein the analog to digital converter includes a signal conditioner configured to condition signals from the plurality of potentiometers and provide output to a processor of the storage rack, the output corresponding to the amount of weight being supported by the storage rack.

3. The storage rack as in claim 2, wherein the processor is configured to receive the output from the signal conditioner and provide the output via a communication protocol.

4. A system for determining an amount of water bottles located at a retail location, comprising:
    a storage rack, the storage rack including: a plurality of shelves; a plurality of levelers each being configured to support the storage rack, each leveler of the plurality of levelers is operably coupled to one of a plurality of potentiometers that is located between the each leveler of the plurality of levelers and a portion of the storage rack, the plurality of potentiometers are operably coupled to an analog to digital converter that sums signals of the plurality of potentiometers and provides an indication of an amount of weight being supported by the storage rack, the amount of weight being associated with an amount of water bottles being supported by the storage rack;
    remote computing device operably coupled to the storage rack; and
    a device operably coupled to the remote computing device, the device being configured to receive a notification indicative of an approximate amount of water bottles being supported by the storage rack from the remote computing device.

5. The system as in claim 4, wherein the analog to digital converter includes a signal conditioner configured to condition signals from the plurality of potentiometers and provide an output to a processor of the storage rack, the output corresponding to the amount of weight being supported by the storage rack.

6. The system as in claim 5, wherein the processor is configured to receive the output from the signal conditioner and provide the output via a communication protocol.

7. The system as in claim 6, wherein the communication protocol is selected from the group comprising: WiFi; Cellular; Gateway; and an access point.

8. The system as in claim 4, wherein the device is selected from the group comprising: a cell phone; a server; a laptop; and a tablet.

9. A method for determining an amount of water bottles located at a retail location, comprising:
    providing a storage rack, the storage rack including: a plurality of shelves; a plurality of levelers each being configured to support the storage rack, each leveler of the plurality of levelers is operably coupled to one of a plurality of potentiometers that is located between the each leveler of the plurality of levelers and a portion of the storage rack, the plurality of potentiometers are operably coupled to an analog to digital converter that sums signals of the plurality of potentiometers and provides an indication of an amount of weight being supported by the storage rack, the amount of weight being associated with an amount of water bottles being supported by the storage rack;

receiving by remote computing device operably coupled to the storage rack the indication of the amount of weight being supported by the storage rack; and providing a notification indicating an approximate amount of water bottles located on the storage rack to a device operably coupled to the remote computing device, the device being configured to receive the notification indicating an approximate amount of water bottles located on the storage rack from the remote computing device.

10. The method as in claim 9, wherein the analog to digital converter includes a signal conditioner configured to condition signals from the plurality of potentiometers and provide an output to a processor of the storage rack, the output corresponding to the amount of weight being supported by the storage rack.

11. The method as in claim 10, wherein the processor is configured to receive the output from the signal conditioner and provide the output via a communication protocol.

12. The method as in claim 11, wherein the communication protocol is selected from the group comprising: WiFi; Cellular; Gateway; and an access point.

13. The method as in claim 12, wherein the device is selected from the group comprising: a cell phone; a server; a laptop; and a tablet.

14. The method as in claim 9, wherein the device is selected from the group comprising: a cell phone; a server; a laptop; and a tablet.

* * * * *